Patented Mar. 18, 1941

2,235,789

UNITED STATES PATENT OFFICE 2,235,789

HALOGEN ACYL ALKYL PENTOSES

Elwood V. White, Moscow, Idaho, assignor to The Dow Chemical Company, Midland, Mich., a corporation of Michigan No Drawing. Application September 13, 1939, Serial No. 294,687

6 Claims. (Cl. 260—210)

This invention relates to halogen acyl alkyl pentoses having the general formula

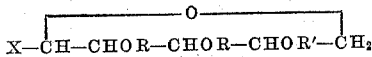

wherein X is chlorine or bromine, one R is an alkyl radical, the other R is alkyl or acyl, and R' is an acyl radical. The pentose may be exylose, arabinose, or other compound having the indicated structure.

Compounds having the formula given above are useful as intermediates in the preparation of new ethers and ether esters of pentose glycosides adapted for use as plasticizers for carbohydrate ethers and esters. The new halogen acyl alkyl pentoses may be prepared in a manner to assure the desired structural configuration by reacting upon alkyl ethers of hemi-cellulose or the corresponding ethers of other pentosans with an acyl halide or other acylating-halogenating agent, such as a solution of the hydrogen halide in an anhydrous lower fatty acid or lower fatty acid anhydride. For example, ethyl hemi-cellulose reacts with acetyl bromide-acetic acid mixture to give 1-bromoacetyl ethyl pentose, wherein the ethyl group is in at least one of the 2 or 3 positions, the acetyl group is in the 4 position, and all hydroxyl groups in the pentose product are substituted either by the ethyl or the acetyl groups.

The following example illustrates the practice of the invention:

50 grams of fully ethylated hemi-cellulose (2 ethyl groups per pentose unit) is added portionwise to a mixture of 150 cc. of glacial acetic acid and 30 cc. of acetyl bromide at a temperature of about 8°–10° C. The reaction mixture is set aside in a refrigerator in a stoppered flask for 6 hours at a temperature of 0°–10° C. The mixture is diluted with about 3 volumes of ethyl ether, and poured into ice water. The ether layer is washed with several successive portions of ice water to remove acetic acid and hydrogen bromide. The bromo acetyl ethyl xylose remains in the ether solution which is then clarified with charcoal, filtered, and dried. Analysis shows the product to contain 25.5 per cent of bromine, corresponding closely to a product of the formula

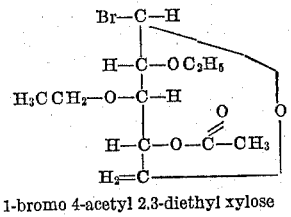

1-bromo 4-acetyl 2,3-diethyl xylose

When partially alkylated hemi-cellulose is treated in like manner, the bromo acetyl ethyl pentose obtained has bromine in the 1 position, an ethyl group in one of the 2 or 3 positions, an acetyl group in the 4 position and one in whichever of the 2 or 3 positions is unoccupied by the ethyl groups. The formulas are represented thus

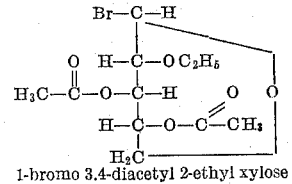

1-bromo 3,4-diacetyl 2-ethyl xylose

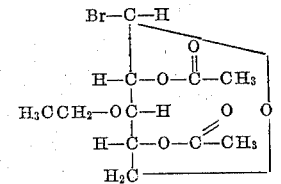

1-bromo 2,4-diacetyl 3-ethyl xylose

The invention has been illustrated with respect to bromo acetyl ethyl pentoses prepared from ethyl ethers of hemi-cellulose. Similar compounds, within the scope of the invention, may be prepared from other ethers of hemi-cellulose or other ethers of pentosans, such, for example, as the propyl, butyl, or lauryl ethers of the pentosans. Combined acylating and halogenating agents other than acetyl bromide may also be used. To illustrate, acetyl chloride, propionyl chloride or bromide, or butyryl chloride or bromide may be used suitably in solution in the corresponding fatty acid or mixture thereof with the fatty acid anhydride. Instead of the acyl halide, there may be used a solution of hydrogen chloride or hydrogen bromide in acetic acid, or equivalent fatty acid, suitably in the presence of the fatty acid anhydride.

The new compounds decompose when heated or when exposed to light and are preferably employed in solution soon after their preparation. If necessary to keep them for use at a later time, they may be stored in a cold place suitably in solution in ethyl ether or like inert solvent in a dark glass container. They are all readily reactive with metal phenolates or with primary alcohols in alkaline medium to produce new glycosidic compounds as described in co-pending application, Serial No. 294,688, filed concurrently herewith.

We claim:

1. A compound having the general formula

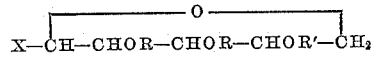

wherein one R is an alkyl radical, the other R is selected from the group consisting of alkyl radicals and acyl radicals, R' is an acyl radical and X is one of the halogens bromine and chlorine.

2. A compound having the general formula set forth in claim 1, wherein at least one of the radicals R is an ethyl group.

3. A compound having the general formula set forth in claim 1, wherein the acyl radical is acetyl.

4. A compound having the general formula set forth in claim 1, wherein the halogen is bromine.

5. 1-bromo 4-acetyl 2.3-diethyl exylose.

6. A bromo acetyl ethyl pentose having the formula

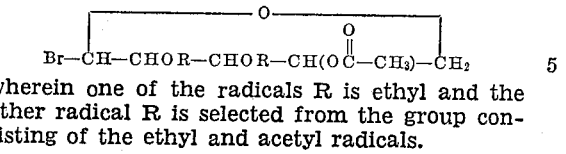

wherein one of the radicals R is ethyl and the other radical R is selected from the group consisting of the ethyl and acetyl radicals.

ELWOOD V. WHITE.